United States Patent [19]

Lang et al.

[11] Patent Number: 4,831,003
[45] Date of Patent: May 16, 1989

[54] CATALYST COMPOSITION AND PROCESS OF MAKING

[75] Inventors: Robert J. Lang, Baytown, Tex.; Peter S. Maa; Veluswamy R. LaVanga, both of Baton Rouge, La.

[73] Assignee: Exxon Research and Engineering Company, Florham Park, N.J.

[21] Appl. No.: 95,942

[22] Filed: Sep. 14, 1987

[51] Int. Cl.$^4$ .............................................. B01J 21/18
[52] U.S. Cl. .................................... 502/182; 502/183; 502/185; 502/439
[58] Field of Search ................. 502/182, 183, 185, 439

[56] References Cited

U.S. PATENT DOCUMENTS

| | | | |
|---|---|---|---|
| 2,976,254 | 3/1961 | Mason et al. ................. | 502/182 OR |
| 3,123,567 | 3/1964 | Ruelle et al. ................ | 502/183 X R |
| 4,082,652 | 4/1978 | Voorhies ...................... | 502/185 X R |
| 4,295,995 | 10/1981 | Bearden, Jr. et al. ....... | 502/183 OR |
| 4,295,996 | 10/1981 | Bearchen, Jr. et al. ..... | 502/183 OR |

FOREIGN PATENT DOCUMENTS 1129835  8/1982  Canada .................................. 502/183

Primary Examiner—William R. Dixon, Jr.
Assistant Examiner—Karl Group
Attorney, Agent, or Firm—Roy J. Ott

[57] ABSTRACT

A catalyst composition prepared by depositing a metal or metal compound onto a carbon support formed, in effect, simultaneously with the deposition of the metal or metal compound via partial combustion of an unsaturated hydrocarbon and thereafter converting said metal or metal compound to an oxide or sulfide having hydrogenation activity. The metal is selected from the group of metals consisting of Groups II-B, IV-B, IV-A, V-A, VI-A, VII-A and VIII-A metals of the Periodic Table of the Elements. The catalyst compositions are useful in hydroconversion and hydrotreating processes.

12 Claims, 1 Drawing Sheet

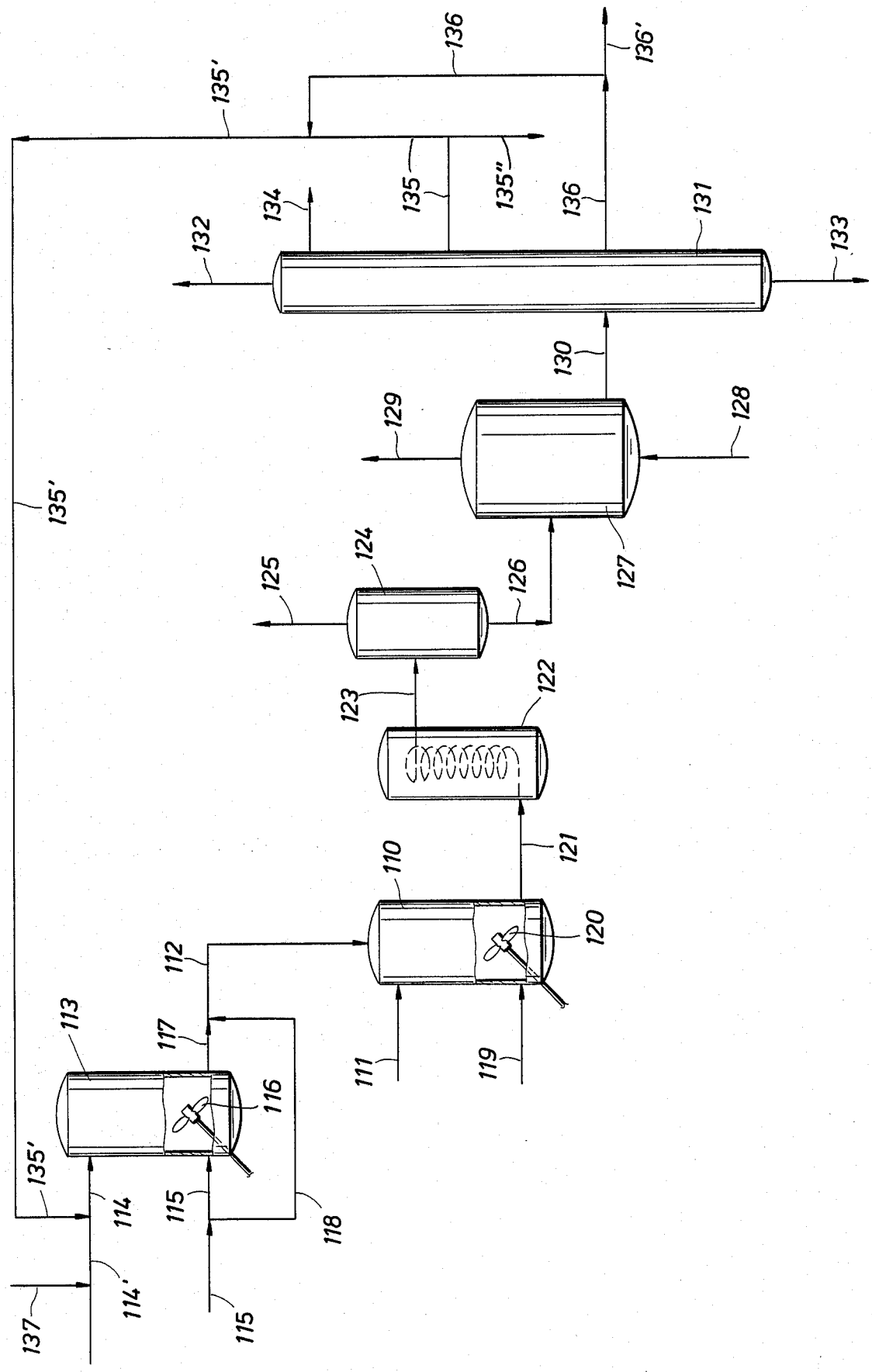

4,831,003

CATALYST COMPOSITION AND PROCESS OF MAKING

BACKGROUND OF THE INVENTION

This invention relates to a catalyst composition and to processes wherein said catalyst composition is used. More particularly, this invention relates to a supported heterogeneous catalyst composition and to processes wherein various carbonaceous materials are contacted with hydrogen and wherein said heterogeneous catalyst composition is used.

Heretofore, several hydroconversion and/or hydrotreating catalysts have been identified and used in various hydroconversion hydrotreating processes. In general, the catalyst compositions heretofore proposed comprised at least one transition metal oxide or sulfide, particularly a Group VI or Group VIII metal oxide or sulfide, and the catalyst may be either supported or nonsupported. As is well known in the prior art, and in both cases, the metal oxide or sulfide may be preformed and used directly to produce the catalyst composition or the oxide or sulfide may be produced from a suitable precursor which will either decompose to or be readily converted to the metal oxide or sulfide either prior to or during the hydroconversion or hydrotreating operation.

As is well known in the prior art, the catalysts proposed heretofore are useful in the hydroconversion of various carbonaceous materials such as coal, lignite, peat, bitumen, heavy oils and the like to lower molecular weight products which may be either gaseous, liquid or a mixture of gaseous and liquid materials. The catalysts proposed heretofore are also useful in various hydrotreating processes such as hydrodeoxygenation, hydrodenitrogenation and hydrodesulfurization processes wherein the oxygen, nitrogen and/or sulfur contents of the feedstocks is effectively reduced. In general, the supported, heterogeneous catalysts heretofore proposed are not as active in the various hydroconversion and/or hydrotreating processes as are the nonsupported catalysts prepared by decomposition or conversion of a suitable precursor, particularly a precursor that is soluble in either the feedstock to be hydroconverted or hydrotreated or at least the solvent used in the hydroconverting or hydrotreating process. As a result, considerable effort has been devoted to the development of hydroconversion or hydrotreating catalysts produced in situ via the decomposition or conversion of a suitable precursor.

As is well known in the prior art, the effectiveness of hydroconversion and hydrotreating catalysts produced via the decomposition or conversion of a soluble precursor has been limited apparently by the respective solubility of the precursor either in the feedstock or the solvent used in the process prior to its decomposition or conversion to the corresponding metal oxide or sulfide and, perhaps, to some extent, by the temperature at which this decomposition or conversion is accomplished. While the reason or reasons for this limitation on catalytic effectiveness is not well known, it is believed to be due either to the particle size of the active catalyst species ultimately formed directly or through agglomeration in the reaction media or to poor distribution of the active catalyst species within the reaction mixture. In any case, it is frequently difficult to control the effectiveness, particularly the catalytic activity, of a catalyst which is prepared via the decomposition or conversion of a precursor compound. These catalysts have not, therefore, always resulted in maximum or optimum effectiveness when used in the various hydroconversion and hydrotreating operations. There is, then, a need for an improved catalyst composition which will be more effective in the various hydroconversion and/or hydrotreating processes.

SUMMARY OF THE INVENTION

It has now been discovered that the foregoing and other disadvantages of the prior art catalyst compositions can be avoided, or at least reduced, with the catalyst compositions of this invention and improved hydroconversion and hydrotreating processes provided by using said catalyst compositions therein. It is, therefore, an object of this invention to provide an improved catalyst composition. It is another object of this invention to provide improved hydroconversion and hydrotreating processes wherein the improved catalyst compositions of this invention are used. It is still a further object of this invention to provide such an improved catalyst which will permit increased conversion in various hydroconversion and hydrotreating processes. It is yet another object of this invention to provide an improved hydroconversion process wherein the yield of lower molecular weight, liquid products is increased. It is still another object of this invention to provide improved hydrotreating processes wherein the amount of heteroatoms such as oxygen, nitrogen, sulfur and the like removed is increased. The foregoing and other objects and advantages will become apparent from the description of the invention set forth hereinafter, the examples contained therein and the drawing appended thereto.

In accordance with the present invention, the foregoing and other objects and advantages are accomplished with a supported catalyst composition comprising at least one metal oxide or sulfide and a carbon support. The catalyst composition will be formed by depositing one or more metals and/or metal compounds from the vapor phase at an elevated temperature onto a carbon support formed in situ as the catalyst composition is formed. The metals and/or metal compounds actually incorporated onto the carbon support may, when necessary, then be converted to an active oxide or sulfide. As indicated more fully hereinafter, it is important that the carbon support have a maximum primary particle size in any direction within the range from about 50 to about 5000 Angstroms, although structures built or formed from the primary particles may be larger. Surface areas of the primary particles will be greater than about 100 m$^2$/g.

BRIEF DESCRIPTION OF THE DRAWING

The Figure is a schematic flow diagram of a hydroconversion process within the scope of the present invention.

DETAILED DESCRIPTION OF THE INVENTION

As indicated supra, the present invention relates to a catalyst composition and to hydroconversion and hydrotreating processes wherein said catalyst composition is used. As also indicated supra, the catalyst composition will comprise at least one metal oxide or sulfide and a carbon support. As further indicated supra, the metal or metals will be deposited onto the carbon support from the vapor phase. As still further indicated supra, the carbon support will be formed in the same step in which the metal, metals, metal compound and/or metal compounds are deposited.

In general, any of the metals known in the prior art to exhibit hydrogenation activity in the oxide or sulfide form may be used in the catalyst composition of this invention. Suitable metals, then, include the metals of Groups II-B, IV-B, IV-A, V-A, VI-A, VII-A and VIII-A of the Periodic Table of the Elements and mixtures of such metals. As used herein, all reference to Groups of the Periodic Table of the Elements shall mean as these Groups are depicted in the Periodic Table of the Elements published by Sargent-Welch Scientific Company and copyrighted 1980. The metals in these Groups include zinc, cadmium, mercury, germanium, tin, lead, titanium, zirconium, hafnium, vanadium, niobium, tantalum, chromium, molybdenum, tungsten, manganese, technetium, rhenium, iron, cobalt, nickel and the noble metals including platinum, iridium, palladium, osmium, ruthenium and rhodium. As is well known, the metals of Group VI-A, particularly molybdenum, and Group VIII-A, particularly the metals of the iron group; viz., iron, cobalt and nickel, are particularly effective as hydrogenation catalysts and these metals are, therefore, preferred either singly or in combination in the catalyst compositions of this invention.

As indicated supra, the metal component of the catalyst compositions of this invention will be incorporated onto the in situ formed carbon support via vapor phase deposition of sublimed or otherwise vaporized metal(s) and/or metal compound(s). In general, the metal may be incorporated or deposited onto the in situ carbon support in any form that may be ultimately converted to an active oxide or sulfide. As is well known in the prior art, sublimation occurs when a solid goes to a vapor phase and then back to a solid without the formation, apparently at least, of a liquid phase. As is also well known in the prior art, all metals and metal compounds have a significant vapor pressure, particularly at elevated temperatures. Sublimation and vaporization of a metal or metal compound is, of course, independent of external pressure, but lower pressures, particularly vacuums, can increase the vaporization rate of a metal or metal compound. Moreover, increased temperature significantly increases the vapor pressure of a metal or metal compound. As a result, elevated temperatures will be used and reduced pressures may be used in preparing the catalyst compositions of the present invention.

In general, any metal or compound of a metal identified above may be used as a source of the metal or metals deposited on the carbon support formed in situ in the catalyst compositions of the present invention. This includes metals and metal compounds requiring extremely high temperatures to effect vapor phase deposition since the carbon support which is formed in situ is resistant to sintering. Suitable metal compounds, then, include the metals, per se, and various metal salts such as the metal halides, metal sulfides, metal borates and the like and various metal oxides such as those formed by the reaction of the metal and oxygen in varying oxidation states of the metal. In general, and after the metal or a metal compound has been deposited onto the carbon support, the metal or metal compound will be converted to an active oxide or sulfide form. In this regard, and as is well known in the prior art, all metals known to have hydrogenation activity do not exhibit particularly good hydrogenation activity in all valence states and, as a result, even when the metal is incorporated as an oxide or sulfide, it is frequently necessary to further oxidize or reduce the metal oxide or sulfide actually deposited on the carbon support to produce an active hydrogenation catalyst.

In general, the metal, the mixture of metals, the metal compound and/or the mixture of metal compounds will be vaporized by heating to a temperature within the range from about 800° C. to about 2000° C. in the presence of a carbon support formed in situ and then cooled such that the metal(s) or metal compound(s) are deposited and possibly chemisorbed onto the carbon support. The metal, metals, metal compound and/or metal compounds will, then, be heated in an atmosphere wherein carbon, such as soot or carbon black, is formed at the same time. Soot may, of course, be formed by burning a carbonaceous fuel in an oxygen deficient atmosphere. Heat from the burning could, then, be used, at least in part, to vaporize the metal, the mixture of metals, the metal compound or the mixture of metal compounds such that the metal, mixture of metals, metal compound or mixture of metal compounds vaporizes in the flame and then deposits, as a solid or molecular film on the soot as the soot and metal, mixture of metals, metal compound or mixture of metal compounds cools as it moves outwardly from the flame source. Gaseous or vaporized fuels, particularly those containing ethylenic, aromatic and acetylenic unsaturation, are well known to produce soot when burned in an atmosphere deficient in oxygen and such fuels are particularly preferred in the preparation of catalyst compositions within the scope of the present invention wherein the carbon support is produced at the same time (in situ) the metal, mixture of metals, metal compound or mixture of compounds is vaporized.

The conditions used to effect formation of the carbon support and to vaporize the metal component will be controlled such that the carbon actually produced satisfies the aforementioned dimensional requirements. In general, the conditions required will be combustion at a temperature within the range from about 800° C. to about 2000° C. in an atmosphere containing from about 10 to about 90% of the oxygen that would be required to effect complete combustion of the fuel burned in the operation.

Surprisingly, it has been discovered that when a metal or metal compound is deposited on a carbon support formed in situ from a vapor phase and then converted to an active oxide or sulfide form, the active catalyst species, which again is a three dimensional structure, may be in the form of a molecular film or a roughly spherical particle having a maximum dimension in any direction up to about 150 Angstroms. This is, of course, generally, significantly smaller than active catalysts formed via the decomposition or conversion of soluble precursors. As a result, the catalyst composition of this invention is, even though supported, generally more active than those hydrogenation catalysts heretofore prepared from soluble precursors. Moreover, due to the supported nature of the catalyst compositions of this invention, the active metal components are not easily agglomerated at hydroconversion or hydrotreating operating conditions. In general, the catalyst compositions of this invention will comprise from about 1 to about 10 parts by weight of metal component per 100 parts by weight carbon.

The catalyst compositions of the present invention are particularly useful in hydroconversion processes wherein various carbonaceous materials are converted to lower molecular weight products, particularly liquid products, in the presence of hydrogen. The catalyst composition of this invention are also useful in hydrotreating processes such as hydrodeoxygenation hydrodenitrogenation processes, hydrodesulfurization processes and the like. In fact, hydrodesulfurization hydrodenitrogenation, hydrodeoxygenation and the like frequently occur when sulfur, nitrogen and oxygen containing feedstocks are hydroconverted. As is well known, hydroconversion and hydrotreating processes are generally operated at an elevated temperature and pressure. As is also well known, hydrotreating processes are generally operated at milder conditions than are hydroconversion operations wherein hydrocracking is a desired result.

In general, the catalyst composition of this invention may be used to convert any non-gaseous carbonaceous material which is subject to hydrogenation and conversion to lower molecular weight products, particularly lower molecular weight liquid products. The catalysts of this invention are particularly effective in the hydroconversion of higher molecular weight carbonaceous materials which may be either normally solid or normally liquid and which may be either solid or liquid at conversion conditions. Particularly suitable carbonaceous materials, then, include solid carbonaceous materials such as coal, trash, biomass, tarsand bitumen, shale oil and the like and liquid carbonaceous materials such as atmospheric and vacuum petroleum residuals and the like. In general, the heavy oils will have an initial boiling point within the range from about 650° F. to about 1050° F.

In general, and when the carbonaceous material to be hydroconverted is solid at conversion conditions, the carbonaceous material will be ground to a finely divided state and processed in a suitable solvent or diluent. The particular particle size or particle size range actually employed, however, is not critical to the invention and, indeed, essentially any particle size could be employed. Notwithstanding this, generally, such solid carbonaceous materials will be ground to a particle size of less than about ¼ inch and preferably to a particle size of less than about 8 mesh (NBS sieve size) to facilitate movement through the processing equipment. When the carbonaceous material to be processed is liquid at the hydroconversion conditions, the carbonaceous material may also be combined with a suitable solvent or diluent but the use of such a solvent or diluent is not critical or essential and, indeed, the catalyst composition of this invention may be added directly to such carbonaceous materials, particularly at elevated temperatures.

In general, the catalyst compositions of this invention will be added to or combined with the carbonaceous material to be hydroconverted or hydrotreated at a concentration within the range from about 50 ppm to about 5000 ppm, by weight, metal, based on dry, ashfree (DAF) carbonaceous material. In general, the catalyst composition may be added to the solvent or diluent and then combined with the carbonaceous material or combined with the carbonaceous material and then with the solvent or diluent, when a solvent or diluent is used. In either case, the metal or metals will be highly dispersed in the reaction medium and do not agglomerate during the hydroconversion or hydrotreating operations. Moreover, and surprisingly, the catalyst compositions of this invention do not result in significant coke make during the hydroconversion or hydrodetreating operations.

After the mixture of catalyst composition and carbonaceous material has been prepared, either with or without a solvent or diluent, the mixture will be passed either to a carbonaceous material hydroconversion zone or a hydrotreating zone wherein the carbonaceous material will, respectively, either be at least partially converted to lower molecular weight products in the prsence of hydrogen or have one or more heteroatoms at least partially removed therefrom. In general, hydroconversion will be accomplished at a temperature within the range from about 500° F. to about 1000° F. and at a total pressure within the range from about 500 psig to about 7000 psig in the presence of molecular hydrogen at a partial pressure within the range from about 400 psig to about 5000 psig. Hydrotreating, on the other hand, will, generally, be accomplished at a temperature within the range from about 500° F. to about 850° F. at a total pressure within the range from about 500 psig to about 3000 psig in the presence of molecular hydrogen at a partial pressure within the range from about 400 psig to about 2500 psig. In both operations, the desired conversion may be accomplished either in a single stage or in a plurality of stages. In general, the total nominal holding time at conversion conditions will range from about 30 minutes to about 180 minutes.

In general, conversion of the carbonaceous material in a hydroconversion process to lower molecular weight products will result in the production of a normally gaseous product, a normally liquid product and a bottoms product which will have characteristics similar to or identical to those of the feed material. In this regard, it should be noted that when the carbonaceous material is a normally solid material, the bottoms product will be normally solid. When the carbonaceous material is a normally liquid, heavy oil, on the other hand, the bottoms product will be a high boiling liquid product. In hydrotreating processes, on the other hand, the conversion will, generally, retain the feed stock in substantially the same form except that a gaseous product containing one or more heteroatoms such as $H_2S$, $H_3N$, $H_2O$ and the like will be liberated. In the hydroconversion process, the catalyst in some form, will, generally, be primarily in the bottoms product fraction. In the hydrotreating operations, on the other hand, the catalyst will generally remain in a liquid fraction which may be the solvent if a normally solid feed material were hydrotreated and either the feed or the solvent if a liquid carbonaceous material were hydrotreated.

In general, and when a plurality of conversion stages or zones are employed in the hydroconversion process, the gaseous and lighter boiling liquid hydrocarbons will, generally, be separated between each stage. Normally, this separation would include all components having a boiling point below about 350° F. to about 450° F. Moreover, after the lower boiling point materials have been separated, a portion of the remaining slurry could be recycled to any previous stage so as to increase the total conversion realized in the process and to increase the catalyst concentration in the zones through which the portion is recycled. When a single conversion stage or zone is employed or after the final stage when a plurality of conversion stages or zones are used, the product from the conversion will, generally, be separated into at least three product streams. Moreover, in those operations wherein a solvent is used, the spent solvent will be separated from the normally liquid product. In this regard, it should be noted that when the carbonaceous material is a solid and particularly coal, lignite, peat or the like, the solvent fraction will, preferably, have an initial boiling point within the range from about 450° F. to about 750° F. and a final boiling point within the range from about 900° F. to about 950° F.. When a solvent is used with a heavy oil, on the other hand, the solvent fraction will, preferably, have an initial boiling point within the range from about 200° F. to about 750° F. and a final boiling point within the range from about 900° F. to about 1050° F. When a plurality of stages or zones are employed in a hydrotreating process, the gaseous product containing the heteroatom or heteroatoms will be separated from each stage. A portion of the feed material may also be recycled to any previous stage for substantially the same reasons as recycle might be used in the hydroconversion process. When a single conversion stage or zone is employed in a hydrotreating process or after the final stage when a plurality of conversion stages or zones is used, any solvent introduced initially will, generally, be separated and reused as will the metal components of the catalyst. In this regard, and in either process, when the feed was totally liquid in a hydrotreating process or when the bottoms are liquid in a hydroconversion process, the catalyst may be readily recovered via filtration or distillation.

After a carbonaceous material has been converted in a hydroconversion process, the gaseous product may be upgraded to a pipeline gas or the same may be burned to provide energy for the conversion process. Alternatively, all or any portion of the gaseous product may be reformed to provide hydrogen for the hydroconversion process.

The liquid product from a hydroconversion process may be fractionated into essentially any desired product distribution and/or a portion thereof may be used directly as a fuel or upgraded using conventional techniques. Generally, naphtha fraction boiling in the motor gasoline range will be recovered and the naphtha fraction will be further processed to yield a high quality motor gasoline or similar fuel. Also, a middle distillate fraction may be separated from the liquid product and upgraded for use as a fuel oil or as a diesel oil. In a preferred embodiment, any vacuum gas oil boiling range product will be recycled to extinction.

The bottoms product from a hydroconversion process wherein a normally solid carbonaceous material is hydroconverted may be gasified, depending upon its carbon content to produce hydrogen for the conversion process or the bottoms product may be burned to provide heat for the conversion process. In the case of relatively high carbon conversion during the hydroconversion, however, and when the carbon content is too low to make either gasification or combustion feasible, the bottoms product may simply be disposed of as a waste material. In this case, all or a portion of the catalyst may be recovered in either an active or inactive form. When the bottoms product is liquid, on the other hand, the liquid will, preferably, be recycled to extinction with excess catalyst being recovered using methods well known in the prior art.

A single stage embodiment of a process within the scope of the present invention is illustrated in the attached Figure and it is believed that this process will be better understood by reference to this Figure. Referring then to the Figure, a carbonaceous material is introduced in the preparation vessel 110 through line 111. As indicated supra, the carbonaceous material may be either normally solid or normally liquid. When the carbonaceous material is solid at the conditions at which it is introduced into preparation vessel 110, the carbonaceous material will be finely divided. In the preparation vessel, the carbonaceous material is combined with a catalyst composition comprising at least one metal oxide, sulfide or mixture thereof carried on a carbon support, which carbon support was prepared in situ. The supported catalyst composition will have been prepared by contacting at least one metal or metal compound in the vapor phase with a carbon support prepared in situ by burning a carbonaceous fuel in a deficiency of oxygen in the general vicinity of the vaporized metal or metal compound and then cooling to a temperature at which the metal or metal compound deposits onto the carbon support (soot) thus formed in the solid state and thereafter converting the metal(s) and/or metal compound(s) to the desired oxide or sulfide via means not illustrated in the Figure. Conversion of the metal(s) and/or metal compounds to the desired oxide or sulfide may, of course, be accomplished using techniques well known in the prior art. In the embodiment illustrated in the Figure, the catalyst composition is introduced into preparation vessel 110 through line 112. In a preferred embodiment, and particularly when the carbonaceous material is solid, the catalyst composition will have been previously combined with a suitable solvent or diluent. In the embodiment illustrated in the Figure, this combination may be accomplished in a suitable mixing vessel such as 113. In the embodiment illustrated in the Figure, a suitable solvent or diluent is introduced into mixing vessel 113 through line 114 while the catalyst composition is introduced into mixing vessel 113 through lines 115—115. Generally, mixing means such as agitator 116 may be provided in mixing vessel 113. The mixing vessel may be operated at any suitable temperature and the agitator will be operated at speeds sufficient to insure good distribution of the catalyst composition throughout the solvent or diluent. In the embodiment illustrated in the Figure, then, the catalyst composition dispersed in a suitable solvent or diluent is withdrawn from mixing vessel 113 through line 117 and thence into preparation vessel 110 through line 112. When a solvent or diluent is not used or when the catalyst composition and solvent are not premixed, the catalyst composition may be fed directly into line 112 from line 115 through line 118. In those embodiments wherein a solvent is used but not combined with the catalyst composition prior to introduction into preparation vessel 110, a suitable solvent or diluent may be introduced directly into preparation vessel 110 through line 119. Alternatively, additional solvent which may be the same or different from that introduced into mixing vessel 113 through line 114 may be introduced into preparation vessel 110 through line 119. To insure the preparation of a relatively uniform mixture of carbonaceous material, catalyst composition and solvent or diluent, when a solvent or diluent is used, preparation vessel 110 may comprise suitable mixing means such as agitator 120. Generally, the preparation vessel 110 will be operated at conditions suitable for preparation of a satisfactory mixture. After the mixture of carbonaceous material, catalyst composition and solvent or diluent, when a solvent or diluent is employed, is prepared, the same will be withdrawn from the preparation vessel 110 through line 121. The mixture will then be heated to a temperature at or near conversion temperature by passing the same through preheater 122. The mixture is then withdrawn through line 123 and, when a carbonaceous material containing water has been used, the mixture may be passed to flash drum 124 wherein at least a portion of the water, as steam, may be flashed overhead through line 125 and a mixture suitable for hydroconversion withdrawn through line 126. The mixture is then fed to hydroconversion stage or zone 127 and is combined with molecular hydrogen added through line 128.

In the conversion zone 127, the carbonaceous material will be converted, at least in part, to lighter molecular weight products. The conversion will, generally, be achieved at a temperature within the range from about 500° F. to about 1000° F. and at a total pressure within the range from about 500 psig to about 7000 psig in the presence of hydrogen at a hydrogen partial pressure within the range from about 400 psig to about 5000 psig. In a preferred embodiment, the conversion will be achieved at a temperature within the range from about 750° F. to about 900° F. at a total presure within the range from about 1500 psig to about 3000 psig and at a hydrogen partial pressure within the range from about 1200 psig to about 2500 psig. In the embodiment illustrated in the Figure, gaseous products and any unconsumed hydrogen may be withdrawn from the conversion zone through line 129. The remaining effluent from the hydroconversion including any unreacted feed material and spent solvent or diluent, when a solvent or diluent is employed, will be withdrawn from the hydroconversion zone 127 through line 130.

The effluent from conversion stage or zone 127 withdrawn through line 130 is then fed to a suitable separator 131. The separator may consist of any suitable means for separating the effluent into its various fractions such as a gaseous fraction, a liquid fraction, and a bottoms fraction which, when a solid carbonaceous material is converted, will be normally solid. Suitable separation devices include, but are not necessarily limited to, knockout pots, which may be used alone or in combination with, filters, centrifuges, distillation apparatus and the like. In a preferred embodiment, and particularly when a solid carbonaceous material is converted, the separation means will be a distillation column comprising an atmospheric section and a vacuum section. When such a distillation apparatus is employed, a normally gaseous product (entrained gas not separated through line 129) may be withdrawn overhead through line 132. Similarly a bottoms product which may be normally solid and include unconverted feed, catalyst and inorganic residue may be withdrawn through line 133. The normally liquid product may then be separated into fractions having any desired boiling range or ranges. For example, a relatively light boiling product, generally, a naphtha fraction boiling within the motor gasoline range may be withdrawn through line 134. A heavier boiling, middle distillate fraction, for example a fraction having an initial boiling point within the range from about 350° F. to about 450° F. and a final boiling point within the range from about 650° F. to about 850° F. may be withdrawn through line 135 and a still higher boiling, vacuum gas oil, fraction, for example a fraction having an initial boiling point within the range from about 650° F. to about 850° F. and a final boiling point within the range from about 850° F. to about 1100° F. may be withdrawn through line 136.

In a preferred embodiment of the present invention and when a solid carbonaceous material is converted, particularly coal, lignite, peat and the like, at least a portion of the material having an initial boiling point within the range from about 650° F. to about 850° F. and a final boiling point within the range from 850° F. to about 1100° F. will be recycled and used as a solvent. The recycle may be accomplished through lines 136—136 and 135'—135' where the recycle solvent would be introduced into mixing vessel 113 through line 114. In the embodiment illustrated, the heavy boiling fraction may be combined with all or a portion of the middle distillate fraction withdrawn through lines 135—135. The combined fraction may then be recycled as solvent through lines 135'—135' and line 114. When recycle solvent is not, however, used or when the amount of recycle solvent available is not sufficient, extraneous solvent may be introduced into line 114 through lines 137 and 114'. In those cases where the amount of solvent boiling range material is in excess of needs, the excess may be withdrawn through line 135" and/or line 136'. As indicated supra, it is, however, preferred that the higher boiling range liquid product be recycled to extinction so as to increase the yield of lower boiling products. In this embodiment, then, no liquid would be withdrawn through line 136'.

Any stream ultimately withdrawn from the separator may be used directly for any purpose as a final product or any portion or all of the streams may be further upgraded to yield products of enhanced value. For example, the gaseous stream withdrawn through line 129 and overhead through line 132 may be combined, scrubbed to separate pollutants and other noncombustible materials and treated so as to separate molecular hydrogen to yield a pipeline quality gas. Similarly, the lighter boiling fraction withdrawn through line 134, which boils generally in the motor gasoline range, may be further upgraded to yield a high quality motor gasoline. The fraction boiling in the middle distillate range or at least a portion thereof may be further treated to yield a middle distillate fuel oil and in some cases to yield a diesel fuel. The heaviest boiling fraction withdrawn through line 136 may also be further treated to yield a satisfactory vacuum gas oil. The bottoms product withdrawn through line 133 may be burned directly to recover its fuel value, gasified or the same may be discarded directly, especially in those cases where the carbon content is too low to support combustion or justify gasification. As previously indicated, all or a part of the catalyst species may be separated prior to discarding. Moreover, a portion of the bottoms stream could be recycled to the conversion zone 127 though not illustrated to increase the concentration of catalyst therein, thereby increasing the total conversion of carbonaceous material during the conversion step and reducing the amount of catalyst precursor added initially.

When the catalyst composition of this invention is used in a hydrotreating operation, the schematic flow diagram of the process would be essentially the same as that illustrated in the Figure except that separator 131 would, generally, be somewhat simpler in that only the hydrotreated product, spent solvent, when a solvent is used, and the catalyst composition would need to be separated. As indicated supra, this could, generally, be accomplished with an atmospheric distillation apparatus and/or a suitable filter.

PREFERRED EMBODIMENT

In a preferred process embodiment of the present invention, a catalyst comprising molybdenum disulfide ($MoS_2$) on a carbon support will be used to hydroconvert a coal or a vacuum petroleum residual boiling within the range from about 850° F. to about 1050° F. In a preferred catalyst composition embodiment, the catalyst will comprise molybdenum. The carbon support will have a primary particle size within the range from about 50 to about 500 Angstroms and a surface area within the range from about 100 $m^2/g$ to about 1500 $m^2/g$. In a most preferred process embodiment of the present invention, a catalyst composition comprising molybdenum disulfide ($MoS_2$) and nickel sulfide (NiS) and a carbon support will be used to hydroconvert a coal. In the most preferred catalyst composition embodiment, the carbon support will also have a primary particle size within the range from about 50 to about 500 Angstroms. In both the preferred and most preferred catalyst composition embodiments, the metal component will be vaporized in a soot forming flame formed by burning an unsaturated hydrocarbon in an oxygen deficient atmosphere. The vaporized metal component will then be deposited on the soot thus formed as the metal component and the soot move outwardly from the hottest portion of the flame. In the preferred catalyst composition embodiment, the amount of metal or metal component introduced into the flame will be controlled such that from about 1 wt. % to about 5 wt. % metal is deposited on the soot formed in the flame. In a most preferred catalyst composition embodiment, the amount of metal or metal compound introduced into the flame will be controlled such that from about 2.5 wt. % to about 3.5 wt. % metal is deposited on the soot formed in the flame. When a mixture of metals is deposited on the carbon support, the relative amount of each metal will be controlled such that the desired ratio is deposited onto the support. In both the preferred and most preferred catalyst composition embodiments, the molybdenum will be deposited onto the soot as a molybdenum oxide. In the most preferred catalyst composition embodiment, the nickel will be deposited as a nickel oxide, most preferably from vaporized nickel chloride. The oxides will then be converted to the sulfides as the catalyst composition is heated to hydroconversion conditions as a result of the sulfur content in the feedstocks to be hydroconverted.

In the preferred process embodiment, the hydroconversion will be accomplished at a temperature within the range from about 750° F. to about 900° F.. In a most preferred process embodiment, the hydroconversion will be accomplished at a temperature within the range from about 800° F. to about 880° F.. Both the preferred and most preferred process embodiments will be accomplished at a total pressure within the range from about 1500 psig to about 3000 psig in the presence of hydrogen at a hydrogen partial pressure within the range from about 1200 psig to about 2500 psig. The hydroconversion will be accomplished in a single conversion zone or stage with a nominal holding time within the range from about 60 to about 120 minutes. In a preferred process embodiment of the present invention, sufficient catalyst wil be used to provide from about 500 ppm to about 1500 ppm molybdenum based on dry, ash-free carbonaceous material. In a most preferred process embodiment of the present invention, sufficient catalyst will be used to provide from about 500 ppm to about 1500 ppm molybdenum and from about 100 ppm to about 300 ppm nickel based on dry, ash-free coal.

Having thus broadly described the present invention and a preferred and most preferred embodiment thereof, it is believed that the same will become even more apparent by reference to the following examples. It will be appreciated, however, that the examples are presented solely for purposes of illustration and should not be construed as limiting the invention.

EXAMPLE 1

In this example, three catalyst compositions comprising molybdenum oxide on soot were prepared by nebulizing an aqueous solution of ammonium molybdate with $N_2$ and then injecting the aerosol into a burner with acetylene. The acetylene was burned with insufficient oxygen in a diffusion flame. As the mixed feed approached the flame front the ammonium molybdate was converted to molybdenum oxide and volatilized. As the vaporized molybdenum oxide and combusted acetylene approaches or passes through the flame tip, where quenching occurs, soot is formed and the molybdenum oxide condenses thereon. In preparing the three different catalysts, the amount of ammonium molybdate aerosol introduced into the flame was held constant but the flow of soot producing acetylene was varied. As a result, catalyst compositions containing different amounts of molybdenum were produced. In the first run, a catalyst composition comprising 1.29 wt. % molybdenum on soot was prepared. This catalyst composition was identified as precursor A. In the second run, a catalyst composition comprising 2.98 wt. % molybdenum on soot was prepared. This catalyst composition was designated B. In the third run, a catalyst composition comprising 3.15 wt. % molybdenum was produced. This catalyst composition was designated as precursor C. In all three catalyst compositions, the molybdenum was present as $MoO_3$. Photomicrographs of each of the catalyst compositions prepared in this example showed molybdenum oxide particles in a near spherical shape having a diameter within the range from about 50 to about 150 Angstroms, but additional molybdenum oxide was probably deposited as an invisible molecular film on the surface of the soot particles. Also, in all three catalyst compositions, the soot particle size was approximately 500 Angstroms in diameter.

EXAMPLE 2

In this example, a series of runs were completed wherein a portion of the catalyst prepared in Example 1 were used to liquefy a Wyodak coal. Two additional runs were also completed wherein Wyodak coal was liquefied using a phosphomolybdic acid catalyst precursor dissolved in M-Cresol. These runs were completed for purposes of comparison. In the first run, a portion of the catalyst composition designated as catalyst composition A in Example 1 was used at a concentration sufficient to provide 500 ppm molybdenum based on dry coal. In this run, carbon disulfide was included in the feed for purposes of converting the molybdenum oxide catalyst to a molybdenum sulfide catalyst. In the second run, the catalyst composition designated as catalyst composition A in Example 1 was also used but the molybdenum oxide catalyst was contacted with hydrogen and carbon disulfide at 480° F. prior to starting the coal liquefaction. In the third run, the catalyst composition designated as catalyst composition A in Example 1 was again used but the molybdenum oxide catalyst was converted to molybdenum sulfide by reacting with hydrogen and carbon disulfide at 840° F.. In the fourth run, a sufficient amount of the active molybdenum oxide identified as catalyst composition B in Example 1 was used. The molybdenum oxide was, however, converted to molybdenum sulfide by reaction with hydrogen and carbon disulfide at 480° F. prior to the liquefaction. In the fifth run, a portion of the active molybdenum oxide catalyst designated as catalyst composition B in Example 1 was again used and was again converted to the sulfide by reaction with hydrogen and carbon disulfide at 840° F. prior to beginning the liquefaction. In the sixth run, a portion of the active molybdenum oxide catalyst composition designated as catalyst composition C was used. The molybdenum oxide was, however, converted to molybdenum sulfide by incorporating carbon disulfide into the liquefaction reaction. In the seventh run, the active molybdenum oxide composition designated as catalyst composition C was again used, but at a higher concentration. During liquefaction, the molybdenum oxide was converted to molybdenum sulfide by reaction with carbon disulfide added to the liquefaction vessel. In runs eight and nine, the liquefaction was accomplished with a catalyst formed in situ from phosphomolybdic acid (PMA) dissolved in M-Cresol in the prsence of carbon disulfide. Each of the liquefaction runs were completed in tubing bombs using a hydrogen donor solvent containing 1.2 wt. % donatable hydrogen. The runs were completed at 840° F. with an initial room temperature hydrogen pressure of 1000 psig. The liquefaction was continued for 60 minutes at these conditions. As is well known, the tubing bomb runs are completed by adding 3 g of the Wyodak coal and 4.8 g of an MPSS solvent to the tubing bomb. In those runs where the molybdenum was converted to molybdenum sulfide during liquefaction, 0.06 g of carbon disulfide was also added to the tubing bomb. For further purposes of comparison, Wyodak coal was liquefied in a tubing bomb without any added catalyst. For convenience, the results of each of the ten runs is summarized in the Table below which shows the catalyst or catalyst precursor used, the molybdenum concentration, how the molybdenum was sulfided, the total percent of coal converted, and the difference in the total conversion when compared to the run which was made without an extraneous, added catalyst:

TABLE

| Catalyst or Catalyst Precursor | Mo, ppm | How Sulfided | % Conversion* | Increase in % Conversion |
|---|---|---|---|---|
| MoO$_3$—Soot (1.29% Mo) | 500 | CS$_2$** | 53 | 12 |
| MoO$_3$—Soot (1.29% Mo) | 500 | 480° F.-CS$_2$ | 54 | 13 |
| MoO$_3$—Soot (1.29% Mo) | 500 | 840° F.-CS$_2$ | 54 | 13 |
| MoO$_3$—Soot (2.98% Mo) | 500 | 480° F.-CS$_2$ | 55 | 14 |
| MoO$_3$—Soot (2.98% Mo) | 500 | 840° F.-CS$_2$ | 53 | 12 |
| MoO$_3$—Soot (3.15% Mo) | 500 | CS$_2$** | 56 | 15 |
| MoO$_3$—Soot (3.15% Mo) | 1000 | CS$_2$** | 59 | 18 |
| PMA-in M-Cresol | 500 | CS$_2$** | 55 | 14 |
| PMA in M-Cresol | 1000 | CS$_2$** | 59 | 18 |
| None | 0 | None | 41 | Base |

*To cyclohexane solubles
**Sulfided in situ

From the results summarized in the foregoing Table, it is apparent that the supported catalyst composition of this invention is as effective as a catalyst prepared in situ from phosphomolybdic acid in the conversion of Wyodak coal.

EXAMPLE 3

In this example, a series of catalysts were prepared using the same techniques as were used in Example 1 and these catalysts were then used to liquefy a Wyodak coal in tubing bombs using conditions identical to those used in Example 2. For purposes of comparison, two additional runs were completed wherein molybdenum naphthenate was used as a catalyst precursor and one additional run was completed without any added extraneous catalyst. The results of each run are summarized in the following Table which shows, firstly, the catalyst or catalyst precursor actually used, the nebulized solution used to prepare the supported catalyst, the concentration of metals on coal and the increase in conversion for each run when compared to the base case which was completed without an added catalyst. In each run, the catalyst was sulfided by adding carbon disulfide to the liquefaction reactor.

TABLE

| Catalyst or Catalyst Precursor | Nebulized Solution* | Metals on dry Coal, ppm | % Conversion** |
|---|---|---|---|
| Moly-Soot (2.98% Mo) | Mo | 500 | +13 |
| Nickel-Soot (1.11% Ni) | NiCl$_2$ | 1000 | +4 |
| Ni/Mo Soot (.07/.34%) | NiCl$_2$/Mo | 90/410 | +7 |
| Zinc Soot (1.31% Zn) | ZnCl$_2$ | 1000 | +2 |
| Zn/Mo Soot (1.25/.60%) | ZnCl$_2$/Mo | 675/325 | +8 |
| Cobalt Soot (1.20% Co) | CoCl$_2$ | 1000 | +4 |
| Co/Mo Soot (.51/1.63%) | CoCl$_2$/Mo | 240/760 | +12 |
| Ni/W Soot (.60/.19%) | NiCl$_2$/W | 760/240 | +3 |
| 6% Moly Naphthenate | — | 500 | +12 |
| 6% Moly Naphthenate | — | 1000 | +17 |
| None | — | 0 | Base |

*Ammonium heptamolybdate was used as the molybdenum salt and ammonium tungstate for the tungsten salt.
**To cyclohexane solubles.

As will be apparent from the data summarized in the Table, molybdenum sulfide supported on soot is at least as good a coal liquefaction catalyst as is a catalyst derived from a more expensive molynapthenate precursor. The data summarized in the Table also show that a wide range of metals supported on soot are effective coal liquefaction catalysts.

EXAMPLE 4

In this example, a catalyst was prepared using the techniques described in Example 1. This catalyst was designated composition D. It contained 2.5 wt. % molybdenum and was used to hydrogenate naphthalene in the presence of a heavy petroleum residuum which has a tendency to deactivate catalysts. In this Example, a stirred autoclave was charged with 40 g of a heavy Arab vacuum residuum plus 60 g naphthalene and a small quantity of carbon disulfide to sulfide the catalyst in situ during the run. Catalyst composition D was added to provide a molybdenum concentration of 250 ppm based on the autoclave contents. The run was made with a constant hydrogen pressure of 2500 psig for 1 hour at 840° F.. A similar run was made using a molybdenum naphthenate catalyst, but a higher molybdenum concentration of 500 ppm was used. The results are summarized in the Table below:

TABLE

| Catalyst | Wt % Mo in Catalyst | Mo Concentration, wppm on feed | % Conversion Naphthalene to Tetralin |
|---|---|---|---|
| Mo Naphthenate | 6.0 | 500 | 24 |
| Composition D | 2.5 | 250 | 25 |

From the results of this Table it is apparent that the supported catalyst composition of this invention gave a higher naphthalene conversion than the molybdenum naphthenate catalyst even though only half as much molybdenum was used.

While the present invention has been descsribed and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the invention.

Having thus described and illustrated the invention, what is claimed is:

1. A catalyst composition comprising at least one metal oxide or sulfide of a metal selected from the group of metals consisting of the Group II-B, IV-B, IV-A, V-A. VI-A, VII-A and VIII-A metals of the Periodic Table of the Elements and a carbon support, which carbon support is formed by combustion of an unsaturated hydrocarbon in an atmosphere containing less oxygen than that required for complete combustion of the unsaturated hydrocarbon, said metal having been vaporized, at least in part, with heat from a combustion of said unsaturated hydrocarbon and deposited onto the carbon support from the vapor phase, said metal oxide or sulfide having a maximum dimension in any direction up to about 150 Angstroms.

2. The catalyst composition of claim 1 wherein said carbon support has a surface area within the range from about 100 $m^2/g$ to about 1500 $m^2/g$.

3. The catalyst composition of claim 2 wherein said metal is a Group VI metal.

4. The catalyst composition of claim 2 wherein said metal is a Group VIII metal.

5. The catalyst composition of claim 3 wherein said Group VI metal is molybdenum, said molybdenum being present in the catalyst composition at a concentration within the range from about 1 to about 5 wt. %.

6. The catalyst composition of claim 2 wherein said at least one metal oxide or sulfide is a mixture comprising molybdenum disulfide and nickel sulfide, said molybdenum and said nickel being present at a concentration within the range from about 2.5 wt. % to about 3.5 wt. %.

7. A method for preparing a catalyst composition comprising a carbon support consisting of:
   (a) vaporizing at least one metal or metal compound, said metal being selected from the group of metals consisting of the Group II-B, IV-B, IV-A, V-A, VI-A, VII-A and VIII-A metals of the Periodic Table of the Elements, in the presence of an unsaturated hydrocarbon in an atmosphere containing from about 10 to about 90% of the oxygen required to effect complete combustion of said unsaturated hydrocarbon at a temperature sufficiently high to effect partial combustion of said unsaturated hydrocarbon; and
   (b) condensing said vapor on the carbon support which is formed in situ.

8. The method of claim 7 wherein said carbon support has a maximum primary particle size within the range from about 50 to about 5000 Angstroms.

9. The method of claim 8 wherein said metal is a Group VI metal.

10. The method of claim 8 wherein said metal is a Group VIII metal.

11. The method of claim 9 wherein said Group VI metal is molybdenum, said molybdenum being present in the catalyst composition at a concentration within the range from about 1 to about 5 wt. %.

12. The method of claim 8 wherein said at least one metal oxide or sulfide is a mixture comprising molybdenum disulfide and nickel sulfide, said molybdenum and said nickel being present at a concentration within the range from about 2.5 wt. % to about 3.5 wt. %.

* * * * *